(12) United States Patent
Park et al.

(10) Patent No.: US 10,805,499 B2
(45) Date of Patent: Oct. 13, 2020

(54) IMAGE FORMING APPARATUS CAPABLE OF PROVIDING LOCATION-BASED SERVICE AND LOCATION INFORMATION MEASURING APPARATUS FOR PROVIDING LOCATION INFORMATION

(71) Applicant: Hewlett-Packard Development Company, L.P., Spring, TX (US)

(72) Inventors: Sung-Joon Park, Suwon-si (KR); Youn Seo, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/525,850

(22) Filed: Jul. 30, 2019

(65) Prior Publication Data

US 2019/0356808 A1 Nov. 21, 2019

Related U.S. Application Data

(63) Continuation of application No. PCT/KR2017/007031, filed on Jul. 3, 2017.

(30) Foreign Application Priority Data

Feb. 13, 2017 (KR) .................. 10-2017-0019484

(51) Int. Cl.
*G06F 3/12* (2006.01)
*H04N 1/00* (2006.01)
(Continued)

(52) U.S. Cl.
CPC ..... *H04N 1/00973* (2013.01); *H04N 1/00244* (2013.01); *H04N 1/00323* (2013.01);
(Continued)

(58) Field of Classification Search
CPC .......... H04N 1/00973; H04N 1/00244; H04N 1/00323; H04N 1/4433; H04N 2201/0094; H04W 4/029
(Continued)

(56) References Cited

U.S. PATENT DOCUMENTS 7,600,018 B2 * 10/2009 Maekawa ............. H04L 41/026
358/1.15
2008/0062910 A1 * 3/2008 Matsui ............. H04L 29/12783
370/315
(Continued)

FOREIGN PATENT DOCUMENTS

CN 102696215 A 9/2012
CN 103365653 A 10/2013
(Continued)

*Primary Examiner* — Gabriel I Garcia
(74) *Attorney, Agent, or Firm* — Jefferson IP Law, LLP

(57) ABSTRACT

An image forming apparatus capable of providing a location-based service and a location information measuring apparatus are provided. The image forming apparatus includes a memory to store location information of the image forming apparatus, the location information measuring apparatus to measure the location information of the image forming apparatus based on a distance from another apparatus outside the location information measuring apparatus, and a controller to determine whether to update the location information of the image forming apparatus based on the location information stored in the memory and the measured location information, and manage the location information of the image forming apparatus.

15 Claims, 20 Drawing Sheets

(51) Int. Cl.
 *H04W 4/029* (2018.01)
 *H04N 1/44* (2006.01)
(52) U.S. Cl.
 CPC .......... *H04N 1/4433* (2013.01); *H04W 4/029* (2018.02); *H04N 2201/0094* (2013.01)
(58) Field of Classification Search
 USPC ................................................ 358/1.1–1.18
 See application file for complete search history.

(56) References Cited

U.S. PATENT DOCUMENTS

| | | | | |
|---|---|---|---|---|
| 2008/0184345 | A1* | 7/2008 | Kaechi | H04L 63/107 726/5 |
| 2012/0058781 | A1 | 3/2012 | Ahlgren | |
| 2015/0092233 | A1* | 4/2015 | Park | H04N 1/00307 358/1.15 |
| 2016/0381236 | A1* | 12/2016 | Onose | H04N 1/00347 358/1.15 |
| 2018/0131824 | A1* | 5/2018 | Kamasuka | H04N 1/00411 |
| 2018/0198947 | A1* | 7/2018 | Nuggehalli | H04N 1/00204 |

FOREIGN PATENT DOCUMENTS

| | | |
|---|---|---|
| CN | 103517410 A | 1/2014 |
| CN | 104503717 A | 4/2015 |
| EP | 1 327 853 A2 | 7/2003 |
| JP | 2015045929 A | 3/2015 |
| KR | 1020070112548 A | 11/2007 |
| KR | 1020150061389 A | 6/2015 |
| WO | WO-2016036045 A1 | 3/2016 |

\* cited by examiner

FIG. 17A

| IMAGE FORMING APPARATUS LIST | DISTANCE |
|---|---|
| FIRST IMAGE FORMING APPARATUS | 2m |
| SECOND IMAGE FORMING APPARATUS | 3m |
| THIRD IMAGE FORMING APPARATUS | 7m |

FIG. 17B

| IMAGE FORMING APPARATUS LIST | DISTANCE |
|---|---|
| FIRST IMAGE FORMING APPARATUS | 3m |
| SECOND IMAGE FORMING APPARATUS | 2m |
| THIRD IMAGE FORMING APPARATUS | |

FIG. 17C

| IMAGE FORMING APPARATUS LIST | DISTANCE |
|---|---|
| FIRST IMAGE FORMING APPARATUS | 3m |
| SECOND IMAGE FORMING APPARATUS | 2m |
| THIRD IMAGE FORMING APPARATUS | 7m |

IMAGE FORMING APPARATUS CAPABLE OF PROVIDING LOCATION-BASED SERVICE AND LOCATION INFORMATION MEASURING APPARATUS FOR PROVIDING LOCATION INFORMATION

BACKGROUND

Accurate positioning of a device is important to provide a given service based on the location of the device. A positioning technique for measuring a position typically uses a global positioning system (GPS). However, in GPS, it may be difficult to obtain an accurate position indoors.

BRIEF DESCRIPTION OF DRAWINGS

FIG. 17A, FIG. 17B, and FIG. 17C illustrate screens respectively displaying distance information between image forming apparatuses and a user terminal for executing a location-based service according to an example.

DESCRIPTION OF EXAMPLES

Hereinafter, various examples will be described with reference to the drawings. In this regard, the examples may have different forms and should not be construed as being limited to the descriptions set forth herein.

When an element is referred to as being "connected" to another element, the element may not only be "directly connected thereto" but may also be "connected thereto with an intervening element therebetween". In addition, when an element is referred to as "including" another element, unless otherwise described, the element may further include another element rather than exclude the other element. Also, when a region "includes" an element, the region may further include another element instead of excluding the other element, unless otherwise differently stated.

It will be understood that, although the terms "first", "second", etc. may be used herein to describe various elements, these elements should not be limited by these terms. These terms are only used to distinguish one element from another.

"An image forming job" may denote various operations related to an image (e.g. copying, printing, scanning, or faxing), such as formation of an image or generation/storage/transmission of an image file, and "a job" may denote not only an image forming job but also a series of processes required to perform an image forming job.

An "image forming apparatus" may denote any apparatus capable of performing an image forming job, such as a copier, a printer, a scanner, a facsimile machine, a multi-function printer (MFP), or a display apparatus.

A "hard copy" may denote an operation of printing an image on a print medium, such as paper, and a "soft copy" may denote an operation of printing an image on a display device, such as a television (TV) or a monitor or outputting the image to a memory.

"Content" may denote any type of data, such as a picture, an image, a document file, or the like on which an image forming job is to be performed.

"Print data" may denote data converted to a format printable by a printer.

"A scan file" may denote a file generated by scanning an image via a scanner.

"A user" may denote a person who performs an operation related to an image forming job by using an image forming apparatus or by using a device connected to an image forming apparatus in a wired or wireless fashion. "An administrator" may denote a person who has the authority to access all functions and a system of an image forming apparatus. "An administrator" and "a user" may denote the same person.

The following examples are related to an image forming apparatus capable of providing a location-based service and a location information measuring apparatus for providing location information.

Figure 1:
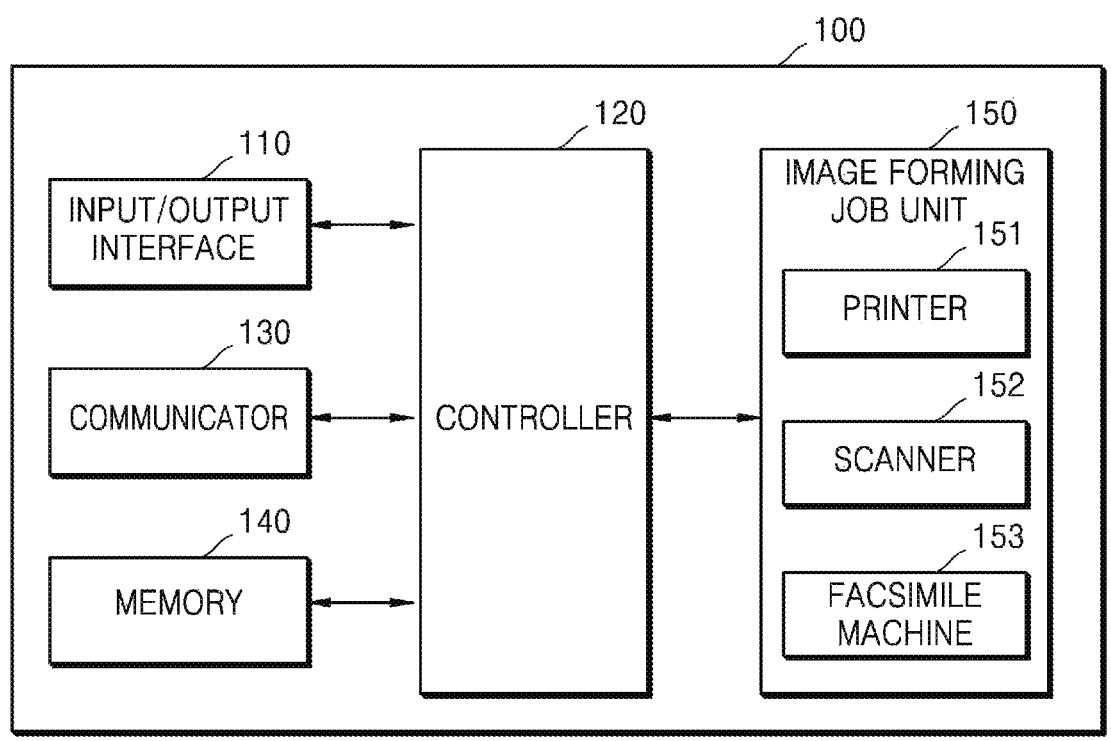
FIG. 1 illustrates an image forming apparatus according to an example.

FIG. 1 illustrates an image forming apparatus according to an example.

Referring to FIG. 1, an image forming apparatus 100 may include an input/output interface 110, a controller 120, a communicator 130, a memory 140, and an image forming job unit 150. Although not illustrated, the image forming apparatus 100 may further include a power unit for supplying power to each element.

The input/output interface 110 may include an input interface for receiving an input for performing an image forming job from a user and an output interface for displaying information such as a performance result of an image forming job or a state of the image forming apparatus 100. For example, the input/output interface 110 may include an operation panel for receiving a user input and a display panel for displaying a screen.

In an example, the input interface may include, for example, an apparatus capable of receiving various user inputs, such as a keyboard, a physical button, a touchscreen, a camera, a microphone, or the like. In addition, the output interface may include, for example, a display panel, a speaker, or the like. However, the disclosure is not limited thereto, and the input/output interface 110 may include an apparatus supporting various inputs and outputs.

The controller 120 may control operations of the image forming apparatus 100 and may include a processor such as a central processing unit (CPU). The controller 120 may control other elements included in the image forming apparatus 100 to perform an operation corresponding to a user input received via the input/output interface 110. The controller 120 may include at least one specialized processor corresponding to each function or may be a single integrated processor.

For example, the controller 120 may execute a program stored in the memory 140, may read a file stored in the memory 140, or may store a new file in the memory 140.

The communicator 130 may perform wired or wireless communication with another device or a network. To this end, the communicator 130 may include a communication module (e.g., a transceiver) supporting at least one of various wired and wireless communication methods. For example, the communication module may be in the form of a chipset or may be a sticker/barcode (e.g., a sticker including a near-field communication (NFC) tag) including information required for communication.

Wireless communication may include, for example, at least one of wireless fidelity (Wi-Fi), Wi-Fi Direct, Bluetooth, ultra-wideband (UWB), NFC, or the like. The wired communication may be any one of Ethernet, home phone-line networking alliance (PNA), power line communication, IEEE 1394, or the like, and may use, for example, at least one of universal serial bus (USB), high definition multimedia interface (HDMI), or the like.

The communicator 130 may be connected to an external apparatus outside the image forming apparatus 100 and thus may transmit and receive signals or data.

Figure 2:
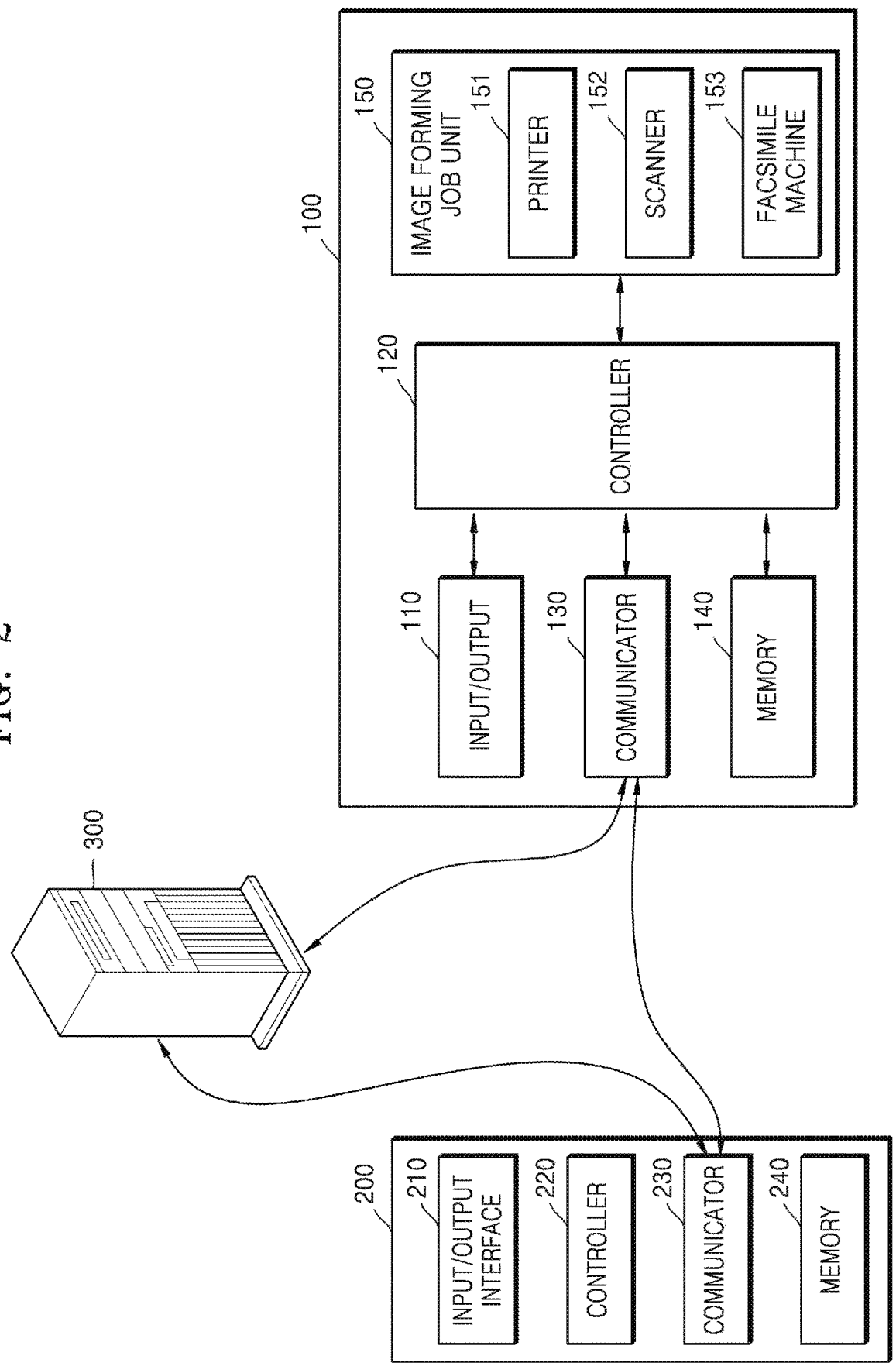
FIG. 2 illustrates an image forming apparatus connected to a user terminal or a server according to an example.

FIG. 2 illustrates an image forming apparatus connected to a user terminal or a server according to an example.

Referring to FIG. 2, the image forming apparatus 100 may be connected to a user terminal 200 through the communicator 130. The communicator 130 may transmit a signal or data received from the user terminal 200 to the controller 120 or may transmit a signal or data generated in the controller 120 to the user terminal 200. For example, when the communicator 130 receives a print command signal and print data from the user terminal 200, the controller 120 may print the received print data through a printer 151.

As shown in FIG. 2, the user terminal 200 may include an input/output interface 210, a controller 220, a communicator 230, and a memory 240. The controller 220 may execute a program stored in the memory 240 and may transmit a signal or data generated as a result to the image forming apparatus 100 via the communicator 230, thereby controlling an image forming job. The user terminal 200 may include, for example, a smartphone, a tablet, a personal computer (PC), a home device, a medical device, a camera, a wearable apparatus, etc.

The communicator 130 may be connected to a server 300 and thus may transmit and receive signals or data. In addition, the communicator 130 may be connected to the user terminal 200 via the server 300. That is, the communicator 130 of the image forming apparatus 100 may transmit and receive signals or data to and from the communicator 230 of the user terminal 200 via the server 300.

Returning to FIG. 1, various types of data such as a program such as an application and a file may be installed and stored in the memory 140. The controller 120 may access and use data stored in the memory 140 or may store new data in the memory 140. In addition, the controller 120 may execute a program installed in the memory 140. Also, the controller 120 may install an application externally received via the communicator 130 in the memory 140.

The image forming job unit 150 may perform an image forming job such as copying, printing, scanning, or faxing.

Although FIG. 1 illustrates the image forming job unit 150 including the printer 151, a scanner 152, and a facsimile machine 153, if necessary, the image forming job unit 150 may include only some of the above elements or may further include an element for performing another image forming job.

The printer 151 may form an image on a recording medium through various printing methods such as an electrophotographic method, an inkjet method, a thermal transfer method, a thermal method, or the like.

The scanner 152 may radiate light onto a document and may read an image recorded on the document by receiving reflected light. As an image sensor for reading an image from a document, for example, a charge-coupled device (CCD), a contact type image sensor (CIS), or the like may be used. The scanner 152 may have a flatbed structure in which a document is located at a fixed position and an image is read as an image sensor moves, a document feed structure in which an image sensor is located at a fixed position and a document is fed, or a combined structure thereof.

The facsimile machine 153 may share an element for scanning an image with the scanner 152, may share an element for printing a received file with the printer 151, and may transmit a scan file to a destination or may externally receive a file.

Terms of components of the above-described image forming apparatus 100 may vary. Furthermore, the image forming apparatus 100 may include at least one of the above-described components and may omit some components or further include other components.

Figure 3:
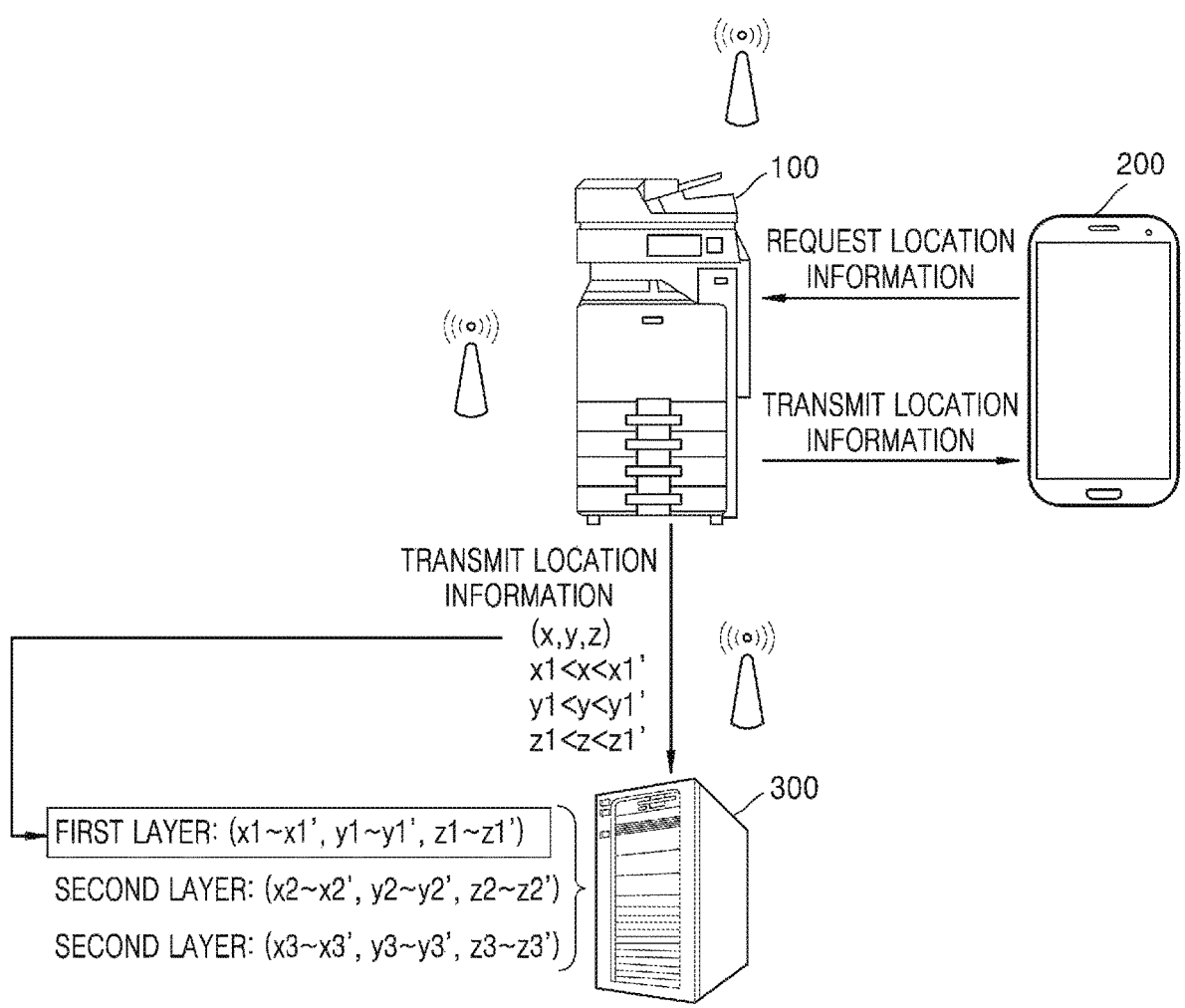
FIG. 3 illustrates an environment in which a location-based service is provided according to an example.

FIG. 3 illustrates an environment in which a location-based service is provided according to an example.

Referring to FIG. 3, the image forming apparatus 100, capable of providing a location-based service, communicates with the user terminal 200, capable of executing the location-based service, the server 300 outside the image forming apparatus 100, or the like to create an environment in which the location-based service is provided.

The term "location-based service" refers to various types of services that provide a given service by utilizing measured location information of a device. For example, there may be a service for guiding a position of the nearest image forming apparatus 100 that may be used by a user, reflecting the position of the image forming apparatus 100 measured in real time, or a service for executing an automatic printing function in the image forming apparatus 100 closest to the user. Location information of the image forming apparatus 100 may be three-dimensional (3D) information including height information.

As illustrated in FIG. 3, the image forming apparatus 100 measures or otherwise determines location information and transmits the location information to the user terminal 200 or the server 300. The image forming apparatus 100 may include a device capable of measuring or otherwise determining location information therein.

The image forming apparatus 100 may measure location information of the image forming apparatus 100 based on a distance from another device external to the image forming apparatus 100. For example, the position of the image forming apparatus 100 may be accurately measured by using a distance from other external apparatuses having their own location information and the location information of the other external apparatuses.

The image forming apparatus 100 may transmit the location information of the image forming apparatus 100 to the user terminal 200 or the server 300. For example, when there is a request for the location information of the image forming apparatus 100 from the user terminal 200, the image forming apparatus 100 may transmit the location information of the image forming apparatus 100 to the user terminal 200 in response to the request. The image forming apparatus 100 may also transmit the location information of the image forming apparatus 100 to the server 300 that manages the location information of the image forming apparatus 100. The server 300 may compare the location information of the image forming apparatus 100, received from the image forming apparatus 100, with a location category classified according to a certain criterion to determine a location category to which the image forming apparatus 100 belongs. The server 300 may store the location category to which the determined image forming apparatus 100 belongs in the server 300 together with the received location information of the image forming apparatus 100. As shown in FIG. 3, the server 300 may compare the location information (x, y, z) of the image forming apparatus 100 with a location category classified by layer to determine a "first layer", which is a location category to which the location information (x, y, z) belongs, as the positional category to which the image forming apparatus 100 belongs.

Figure 4:
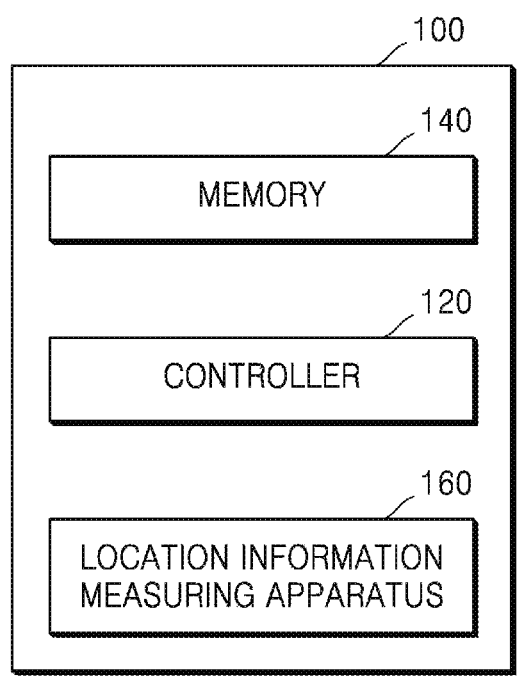
FIG. 4 illustrates an image forming apparatus capable of providing a location-based service according to an example.

FIG. 4 illustrates an image forming apparatus capable of providing a location-based service according to an example.

Referring to FIG. 4, the image forming apparatus 100 capable of providing a location-based service may include the controller 120, the memory 140, and a location information measuring apparatus 160.

The memory 140 may store location information of the image forming apparatus 100.

The location information measuring apparatus 160 may measure or otherwise determine the location information of the image forming apparatus 100 based on a distance from another device outside the image forming apparatus 100. The location information measuring apparatus 160 may measure the location of the image forming apparatus 100 when a certain event occurs or a certain condition is satisfied. For example, the location information measuring apparatus 160 may measure the location information when at least one of the image forming apparatus 100 starts, identification information of the image forming apparatus 100 to be received from an external apparatus and used is changed, or a location information measurement instruction is input from a user. In addition, the location information measuring apparatus 160 may measure the location information according to a preset period.

The location information measuring apparatus 160 may measure a current position of the image forming apparatus 100. The location information measuring apparatus 160 may measure the location information of the image forming apparatus 100 in real time based on a distance from another device outside the image forming apparatus 100. The location information measuring apparatus 160 may accurately measure the position of the image forming apparatus 100 by using a distance from other external apparatuses having their own location information and the location information of the other external apparatuses. According to this method, the location information measuring apparatus 160 may accurately measure the position of the image forming apparatus 100.

The controller 120 may determine whether to update the location information of the image forming apparatus 100 based on location information stored in the memory 140 and the measured location information. The controller 120 determines a difference between the location information stored in the memory 140 and the location information measured by the location information measuring apparatus 160 and compares the determined difference with a first threshold. When the determined difference is greater than the first threshold, the controller 120 may update the location information of the image forming apparatus 100 with the measured location information. However, the location information measuring apparatus 160 may determine to maintain the location information stored in the memory 140 when the determined difference is less than the first threshold. The location information measuring apparatus 160 may compare the determined difference with a second threshold that is greater than the first threshold and may further determine a certain process when the determined difference is greater than the second threshold. For example, the certain process may be to change at least one of an identification address of the image forming apparatus 100, which is set in the image forming apparatus 100, and a processing setting value related to a function of the image forming apparatus 100.

The controller 120 may manage the location information of the image forming apparatus 100 based on a result of the determining by the location information measuring apparatus 160. When the image forming apparatus 100 is required to perform the certain process, the controller 120 controls components constituting the image forming apparatus 100 so that the certain process may be performed.

Although not shown in FIG. 4, the image forming apparatus 100 may further include the communicator 130 for performing connection with an apparatus external to the image forming apparatus 100. The controller 120 may transmit the updated location information of the image forming apparatus 100 through the communicator 130 to the server 300 that manages location information of a plurality of image forming apparatuses or to the user terminal 200 that requests the location information of the image forming apparatus 100.

Figure 5:
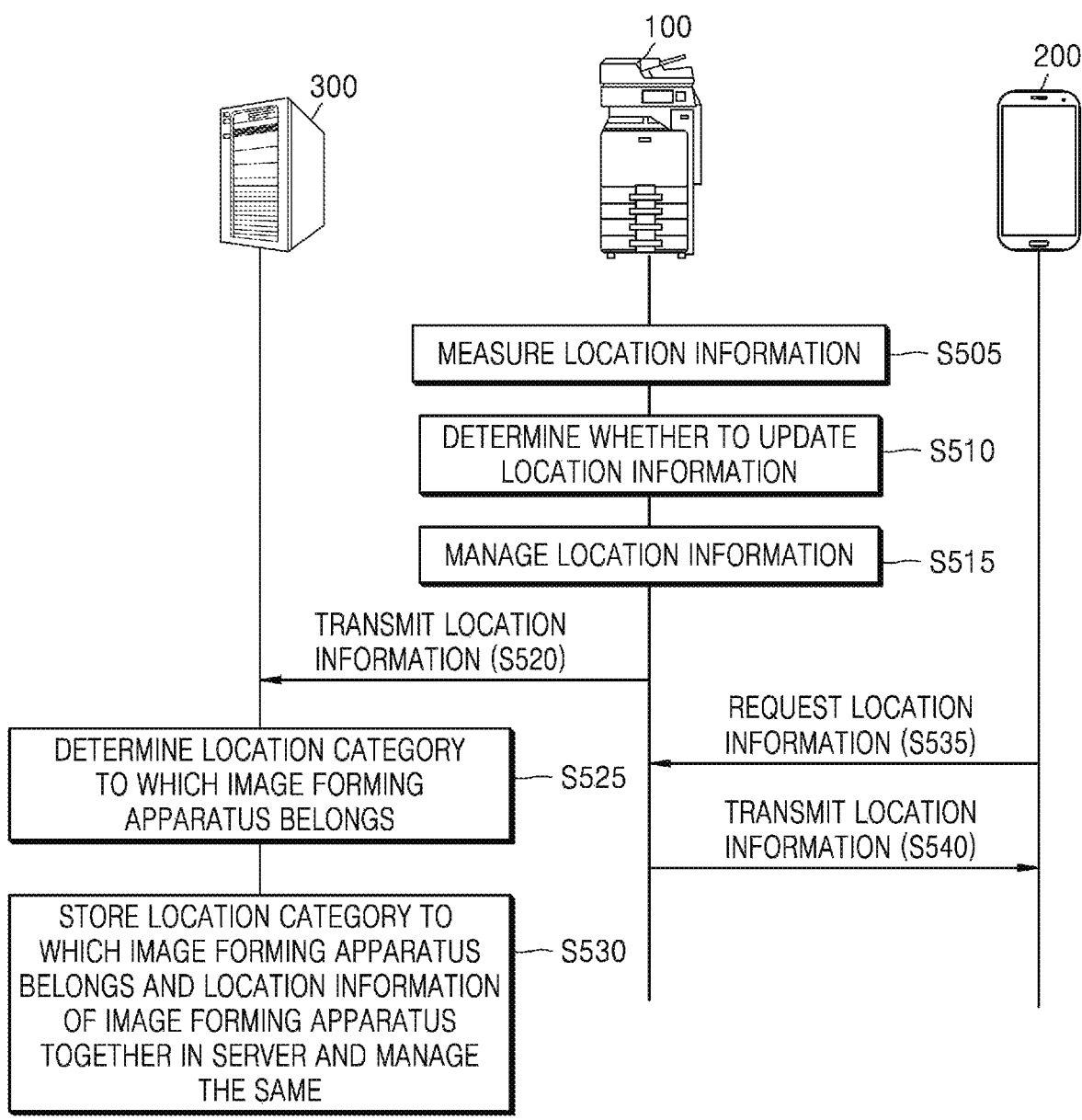
FIG. 5 illustrates operations of an image forming apparatus, a user terminal, and a server in an environment in which a location-based service is provided according to an example.

FIG. 5 illustrates operations of an image forming apparatus, a user terminal, and a server in an environment in which a location-based service is provided according to an example.

Referring to FIG. 5, the image forming apparatus 100 may measure location information of the image forming apparatus 100 in operation S505. To this end, the image forming apparatus 100 may include the location information measuring apparatus 160 capable of performing location measurement.

In operation S510, the image forming apparatus 100 may determine whether to update the location information of the image forming apparatus 100 based on the location information stored in the memory 140 and the measured location information of the image forming apparatus 100.

Figure 6:
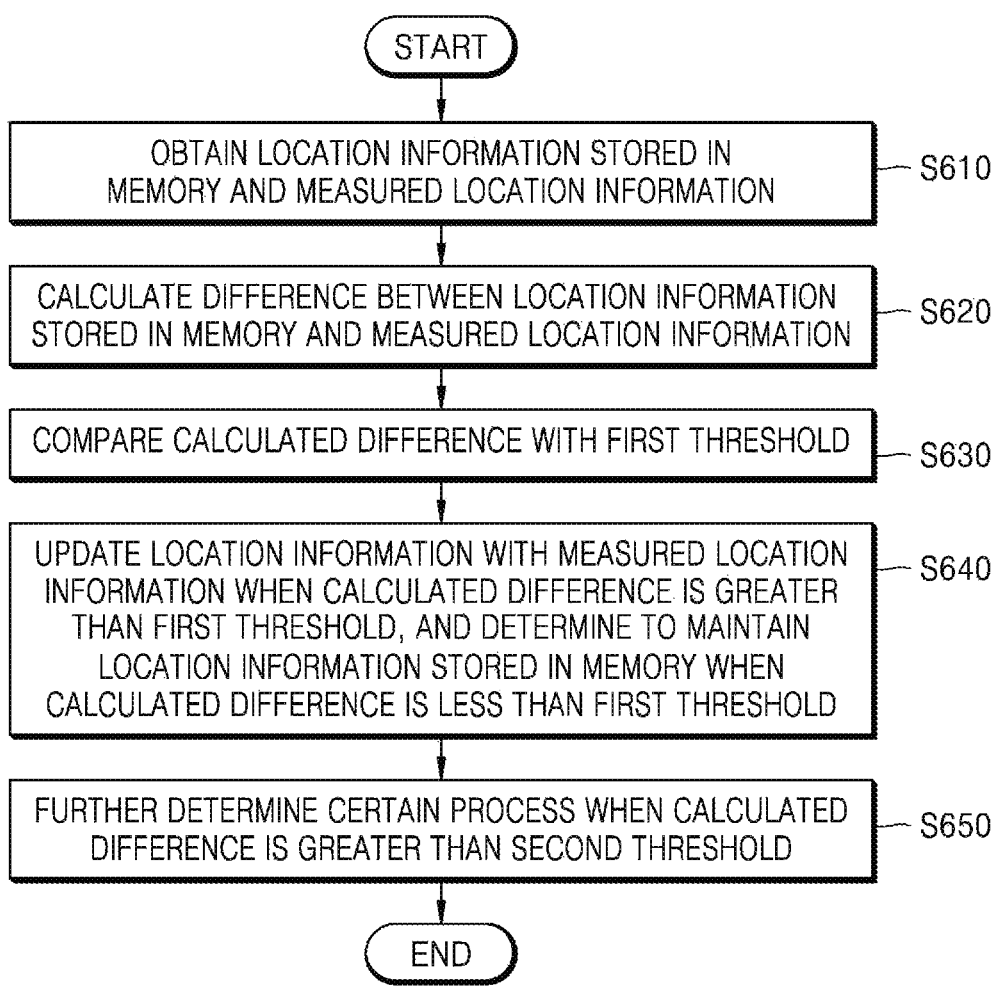
FIG. 6 illustrates operations of providing a location-based service according to a level of a location change of an image forming apparatus according to an example.

FIG. 6 illustrates operations of providing a location-based service according to a level of a location change of an image forming apparatus according to an example.

Referring to FIG. 6, the image forming apparatus 100 may obtain location information stored in the memory 140 and measured location information in operation S610.

In operation S620, the image forming apparatus 100 may determine a difference between the location information stored in the memory 140 and the measured location information.

In operation S630, the image forming apparatus 100 may compare the determined difference with a first threshold.

In operation S640, the image forming apparatus 100 may update the location information of the image forming apparatus 100 with the measured location information when the determined difference is greater than the first threshold and may determine to maintain the location information stored in the memory 140 when the determined difference is less than the first threshold.

In operation S650, the image forming apparatus 100 may compare the determined difference with a second threshold that is greater than the first threshold and may further determine a certain process when the determined difference is greater than the second threshold. Here, the certain process may be to change at least one of an identification address of the image forming apparatus 100, which is set in the image forming apparatus 100, and a processing setting value related to a function of the image forming apparatus 100. The certain process is to not only update the location information of the image forming apparatus 100 when the location change of the image forming apparatus 100 is greater than the second threshold, but also to process an additional process that may increase user convenience. In an example, operation S650 may be performed as an arbitrary operation in the image forming apparatus 100, independent of the second threshold.

Referring again to FIG. 5, in operation S515, the image forming apparatus 100 may manage the location information of the image forming apparatus 100 based on a result of determining whether to update the location information of the image forming apparatus 100. The image forming apparatus 100, based on the existing location information stored in the image forming apparatus 100 and new location information measured by the image forming apparatus 100, may update the location information of the image forming apparatus 100 with the newly measured location information or may maintain the existing location information stored in the image forming apparatus 100.

In operation S520, the image forming apparatus 100 may transmit the location information of the image forming apparatus 100 to the server 300 that manages location information of a plurality of image forming apparatuses. For example, when the image forming apparatus 100 updates the location information of the image forming apparatus 100, the image forming apparatus 100 may transmit the updated location information of the image forming apparatus 100 to the server 300.

In operation S525, the server 300 may compare the location information of the image forming apparatus 100, received from the image forming apparatus 100 with a location category classified according to a certain criterion to determine a location category to which the image forming apparatus 100 belongs. For example, the server 300 may check a location category to which a coordinate value indicating a location of the image forming apparatus 100 belongs to determine a location category to which the image forming apparatus 100 belongs.

In operation S530, the server 300 may store the location category to which the image forming apparatus 100 belongs and the location information of the image forming apparatus 100, received from the image forming apparatus 100, together in the server 300 and manage the same.

In operation S535, the user terminal 200 may request location information from the image forming apparatus 100. However, operation 535 may be an event that may occur at an arbitrary timing and may occur in a different order as shown in FIG. 5.

In operation S540, the image forming apparatus 100 may transmit the location information of the image forming apparatus 100 to the user terminal 200. The user terminal 200 may execute various types of location-based services based on the location information received from the image forming apparatus 100.

Figure 7:
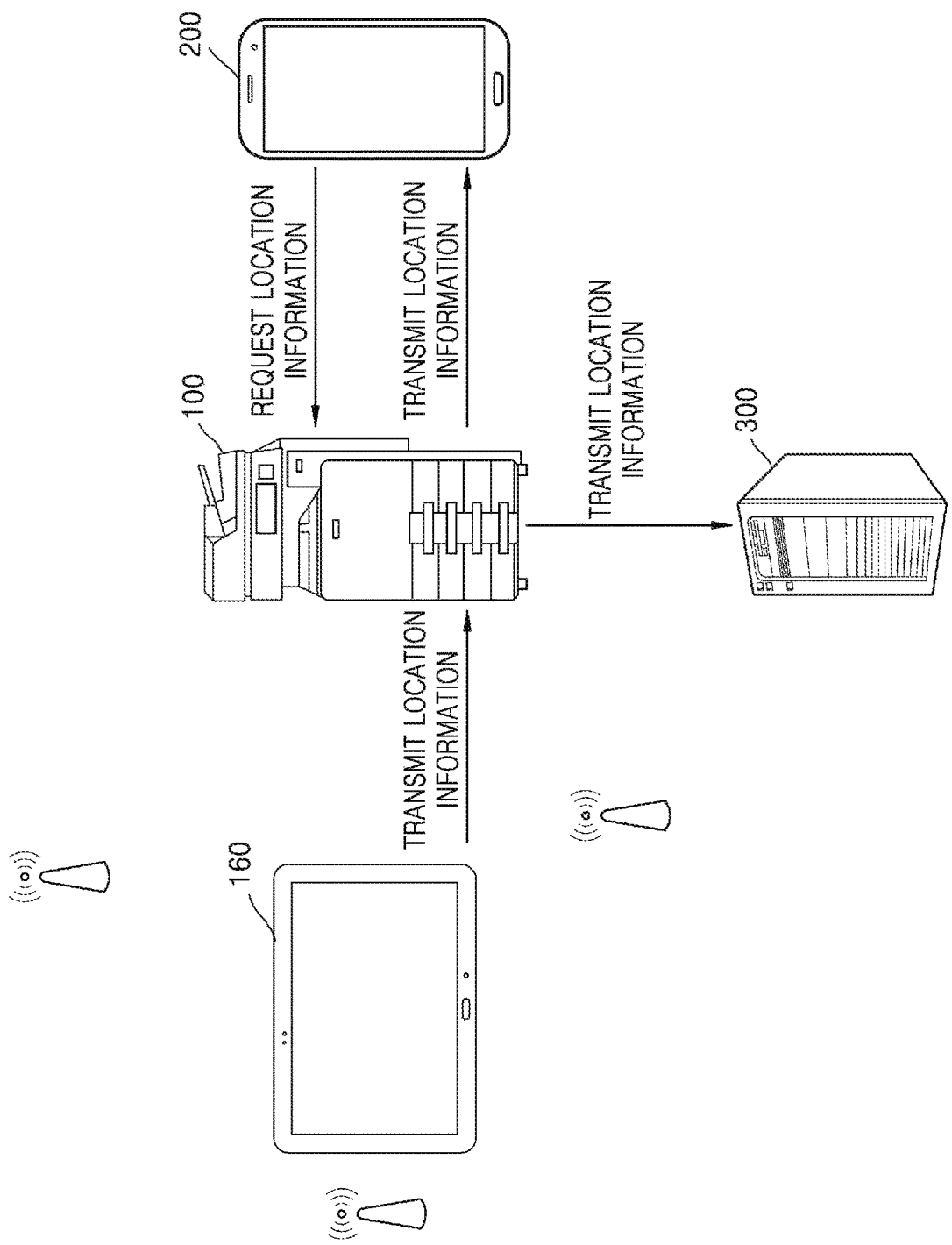
FIG. 7 illustrates an environment in which a location-based service is provided according to an example.

FIG. 7 illustrates an environment in which a location-based service is provided according to an example.

Referring to FIG. 7, the image forming apparatus 100, capable of providing the location-based service, may communicate with the location information measuring apparatus 160, the user terminal 200 capable of executing the location-based service, the server 300 outside the image forming apparatus 100, or the like to create the environment in which the location-based service is provided.

In the example of FIG. 7, the image forming apparatus 100 obtains location information from the external location information measuring apparatus 160 and transmits the location information of the image forming apparatus 100 to the user terminal 200 or the server 300. The position of the image forming apparatus 100 may be estimated by assuming that the location information received from the external location information measuring apparatus 160 is the same as the location information of the image forming apparatus 100 or by considering a certain relationship between the position of the image forming apparatus 100 and the position of the location information measuring apparatus 160.

The location information measuring apparatus 160 may measure the location information of the location information measuring apparatus 160 based on a distance from another device outside the location information measuring apparatus 160. For example, the position of the location information measuring apparatus 160 may be accurately measured by using a distance from other external apparatuses having their own location information and the location information of the other external apparatuses. The location information measuring apparatus 160, when location measurement is performed, may transmit location information to the image forming apparatus 100 or, when location information is updated after performing location measurement, may transmit updated location information to the image forming apparatus 100.

The image forming apparatus 100 may transmit the location information of the image forming apparatus 100 to the user terminal 200 or the server 300. For example, the image forming apparatus 100 may transmit the location information of the image forming apparatus 100 to the user terminal 200 in response to a request from the user terminal 200. The image forming apparatus 100 may also transmit the location information of the image forming apparatus 100 to the server 300 that manages the location information of the image forming apparatus 100. The server 300 may compare the location information of the image forming apparatus 100, received from the image forming apparatus 100 with a location category classified according to a certain criterion to determine a location category to which the image forming apparatus 100 belongs, and may store the location category to which the determined image forming apparatus 100 belongs in the server 300 together with the received location information of the image forming apparatus 100.

Figure 8:
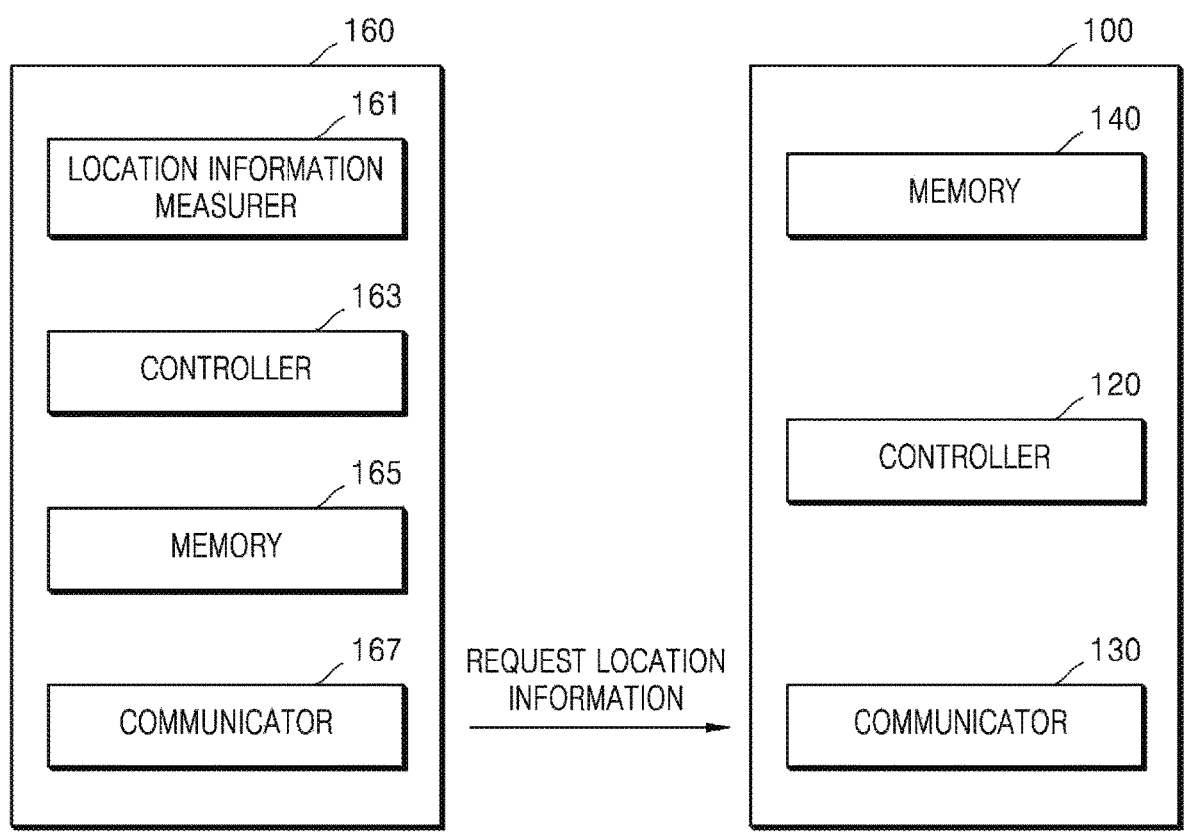
FIG. 8 illustrates a location information measuring apparatus and an image forming apparatus capable of providing a location-based service according to an example.

FIG. 8 illustrates a location information measuring apparatus and an image forming apparatus capable of providing a location-based service according to an example.

Referring to FIG. 8, the location information measuring apparatus 160 may include a location information measurer 161, a controller 163, a memory 165, a communicator 167, and the like.

The location information measurer 161 may measure location information of the location information measuring apparatus 160 based on a distance from another device outside the location information measuring apparatus 160. The location information measurer 161 may accurately measure the position of the image forming apparatus 100 by using a distance from other external apparatuses having their own location information and the location information of the other external apparatuses. The location information measuring apparatus 160 may measure the location information according to a preset period or, when there is a location information request or a request to determine whether to update the location information from the image forming apparatus 100, may measure the location information through the location information measurer 161.

The controller 163 may determine whether to update the location information of the image forming apparatus 100 based on the location information of the image forming apparatus 100, stored in the memory 165, and the location information measured by the location information measuring apparatus 160. The controller 163 may determine a difference between the location information of the image forming apparatus 100, stored in the memory 165, and the location information measured by the location information measuring apparatus 160, may compare the determined difference with a first threshold, and may determine to update the location information of the location information measuring apparatus 160 with the measured location information when the determined difference is greater than the first threshold. However, the controller 163 may determine to maintain the location information stored in the memory 165 when the determined difference is less than the first threshold. The controller 163 may determine a difference between the location information of the image forming apparatus 100, stored in the memory 165, and the location information measured by the location information measuring apparatus 160, and compare the determined difference with a second threshold that is greater than the first threshold. When the determined difference is greater than the second threshold, the controller 163 may perform an initial setup of the image forming apparatus 100. The initial setup refers to an operation of determining setting values for various setting information for functions or operations performed in the image forming apparatus 100. The setup information of the initial setup may include a user name, a password, an internet protocol (IP) address, an IP password, whether to allow a guest, whether a secure network is connected, and the like. For example, when the image forming apparatus 100 is moved to greatly change the position of the image forming apparatus 100, various setting information used for performing functions or operations of the image forming apparatus 100 at the changed position also needs to be changed. The location information measuring apparatus 160 may request the initial setup of the image forming apparatus 100 or transmit various setting information necessary for the initial setup to the image forming apparatus 100 such that the initial setup of the image forming apparatus 100 is performed.

The memory 165 may store the location information of the location information measuring apparatus 160 or the location information of the image forming apparatus 100, received from the image forming apparatus 100. For example, when the location information measuring apparatus 160 is located within a range in which the location information measuring apparatus 160 may communicate with the image forming apparatus 100, the memory 165 may store the location information of the image forming apparatus 100, received from the image forming apparatus 100. Furthermore, when the location information measuring apparatus 160 is located within a range in which the location information measuring apparatus 160 may communicate with the image forming apparatus 100, the memory 165 may further store basic information for determining the initial setup received from the image forming apparatus 100.

The communicator 167 may transmit the location information measured by the location information measuring apparatus 160 to the image forming apparatus 100 according to a result of determining whether to update the location information. When the communicator 167 updates the location information stored in the location information measuring apparatus 160 with the measured location information, the communicator 167 may transmit the updated location information to the image forming apparatus 100. In addition, the communicator 167 may transmit at least one setting value for the initial setup to the image forming apparatus 100, according to a result of the initial setup determination. To this end, the communicator 167 may request connection to the image forming apparatus 100 and may transmit the location information of the location information measuring apparatus 160 when the image forming apparatus 100 approves the request. The communicator 167 may request the image forming apparatus 100 to release the connection when the location information transmission is completed.

The image forming apparatus 100 may include the controller 120, the communicator 130, the memory 140, and the like.

The memory 140 may store the location information of the image forming apparatus 100.

The communicator 130 may receive the updated location information from the location information measuring apparatus 160 that updates the location information stored in the location information measuring apparatus 160 with the measured location information. In addition, the communicator 130 may receive at least one setting value for the initial setup from the location information measuring apparatus 160. To this end, the communicator 130 may receive a request for connection to the image forming apparatus 100 from the location information measuring apparatus 160 and may receive updated location information or at least one setting value for the initial setup from the location information measuring apparatus 160. The communicator 130 may receive a request for connection release from the image forming apparatus 100 from the location information measuring apparatus 160. When the communicator 130 receives a request for connection to the image forming apparatus 100 from the location information measuring apparatus 160, the controller 120 may perform user authentication for the location information measuring apparatus 160 and register unique information of the user authenticated location information measuring apparatus 160 in a unique information list in the memory 140. When the communicator 130 receives the request for connection release from the image forming apparatus 100 from the location information measuring apparatus 160, the controller 120 may delete the unique information of the location information measuring apparatus 160 from the unique information list in the memory 140.

The controller 120 may manage the location information of the image forming apparatus 100 based on the location information of the image forming apparatus 100, stored in the memory 140, and the location information received from the location information measuring apparatus 160. When the communicator 130 receives updated location information from the location information measuring apparatus 160, in a case that the unique information of the location information measuring apparatus 160 is in the unique information list in the memory 140, the controller 120 may manage the location information of the image forming apparatus 100 based on the location information of the image forming apparatus 100, stored in the memory 140, and the location information received from the location information measuring apparatus 160.

Figure 9:
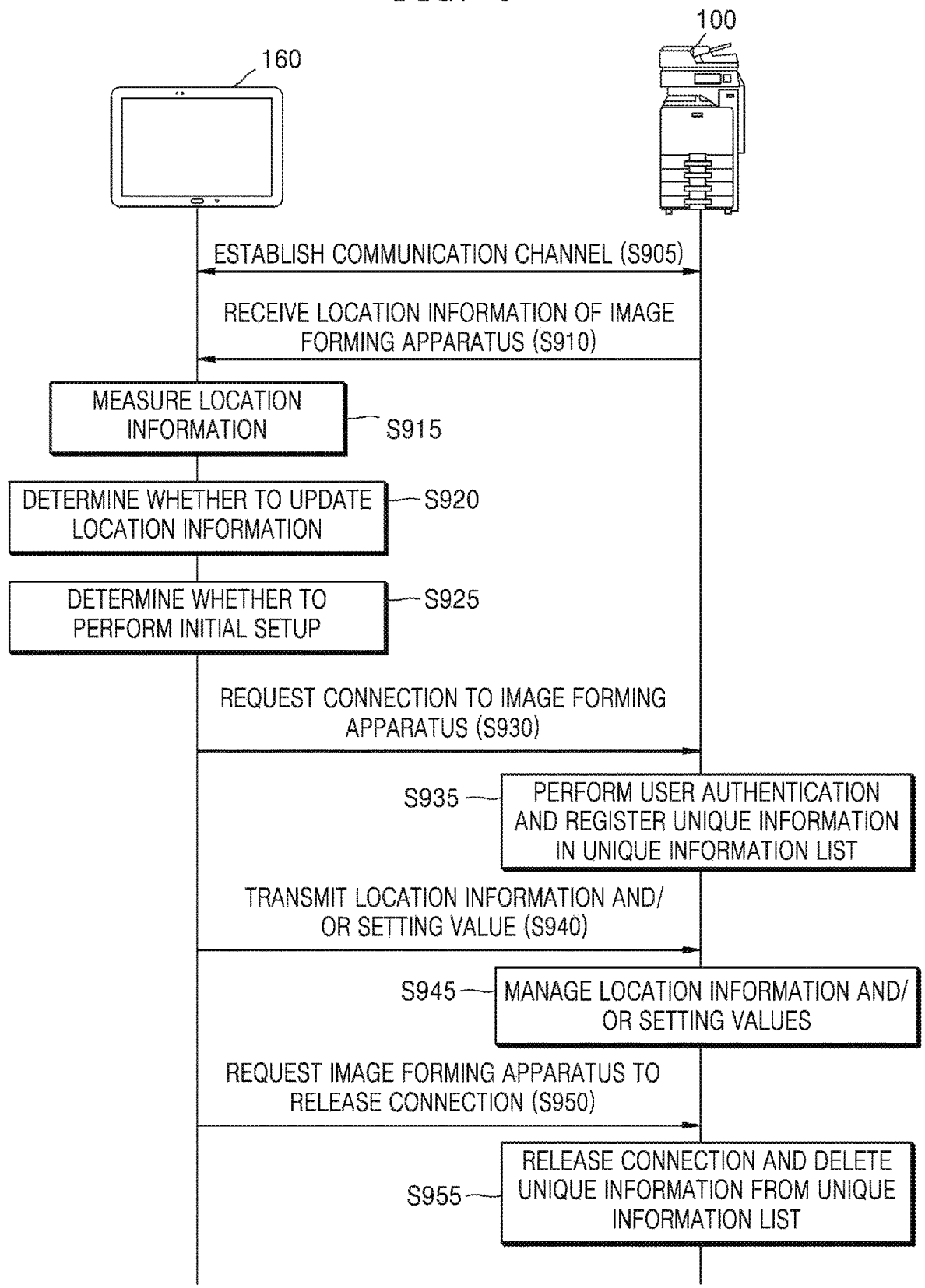
FIG. 9 illustrates operations of a location information measuring apparatus and an image forming apparatus in an environment in which a location-based service is provided according to an example.

FIG. 9 illustrates operations of a location information measuring apparatus and an image forming apparatus in an environment in which a location-based service is provided according to an example.

Referring to FIG. 9, a communication channel between the location information measuring apparatus 160 and the image forming apparatus 100 may be established in operation S905.

In operation S910, the location information measuring apparatus 160 may receive the location information of the image forming apparatus 100 from the image forming apparatus 100. The communication channel established between the location information measuring apparatus 160 and the image forming apparatus 100 in operation 905 may be maintained until either one of the location information measuring apparatus 160 or the image forming apparatus 100 requests a disconnection of the communication channel according to a preset setting, or may be automatically disconnected after a certain information transmission/reception.

In operation S915, the location information measuring apparatus 160 may measure the location information of the location information measuring apparatus 160.

In operation S920, the location information measuring apparatus 160 may determine whether to update the location information of the location information measuring apparatus 160 based on the location information stored in the location information measuring apparatus 160 and the location information measured by the location information measuring apparatus 160. When the location information measuring apparatus 160 determines to update the location information of the location information measuring apparatus 160, the location information measuring apparatus 160 may store the location information measured by the location information measuring apparatus 160 in the location information measuring apparatus 160.

In operation S925, when the location information measuring apparatus 160 determines to update the location information of the location information measuring apparatus 160, the location information measuring apparatus 160 may determine whether to perform an initial setup. For example, the location information measuring apparatus 160 may use a second threshold different from a first threshold used to determine whether to update the location information to further determine the initial setup when a difference between the location information measured by the location information measuring apparatus 160 and the location information of the image forming apparatus 100 is greater than the second threshold.

In operation S930, the location information measuring apparatus 160 may request connection to the image forming apparatus 100.

In operation S935, when the communicator 130 receives the request for connection to the image forming apparatus 100 from the location information measuring apparatus 160, the image forming apparatus 100 may perform user authentication for the location information measuring apparatus 160 and register unique information of the user authenticated location information measuring apparatus 160 in a unique information list.

In operation S940, the location information measuring apparatus 160 may transmit the location information updated in the location information measuring apparatus 160 or at least one setting value for the initial setup to the image forming apparatus 100. Upon updating the location information stored in the location information measuring apparatus 160 with the measured location information, the location information measuring apparatus 160 may transmit the updated location information. The location information measuring apparatus 160 determines whether to update the location information and transmits the updated location information to the image forming apparatus 100 only when the location information is updated so that unnecessary communication may be reduced. In addition, the location information measuring apparatus 160 may transmit at least one setting value for the initial setup to the image forming apparatus 100 when there is a change in the location information to the extent that the initial setup is required.

In operation S945, the image forming apparatus 100 may manage the location information or various setting values of the image forming apparatus 100 based on the location information received from the location information measuring apparatus 160 or at least one setting value for the initial setting. When the image forming apparatus 100 receives the updated location information from the location information measuring apparatus 160, in a case that the unique information of the location information measuring apparatus 160 is in the unique information list, the image forming apparatus 100 may manage the location information of the image forming apparatus 100 based on the location information received from the location information measuring apparatus 160. Information received from the location information measuring apparatus 160 in which the unique information is registered in the unique information list is reliable because the information is received from the location information measuring apparatus 160 in which user authentication has already been performed.

In operation S950, the location information measuring apparatus 160 may request the image forming apparatus 100 to release the connection.

In operation S955, upon receiving the request for connection release from the image forming apparatus 100 from the location information measuring apparatus 160, the image forming apparatus 100 may release the connection and delete the unique information of the location information measuring apparatus 160 from the unique information list.

Figure 10:
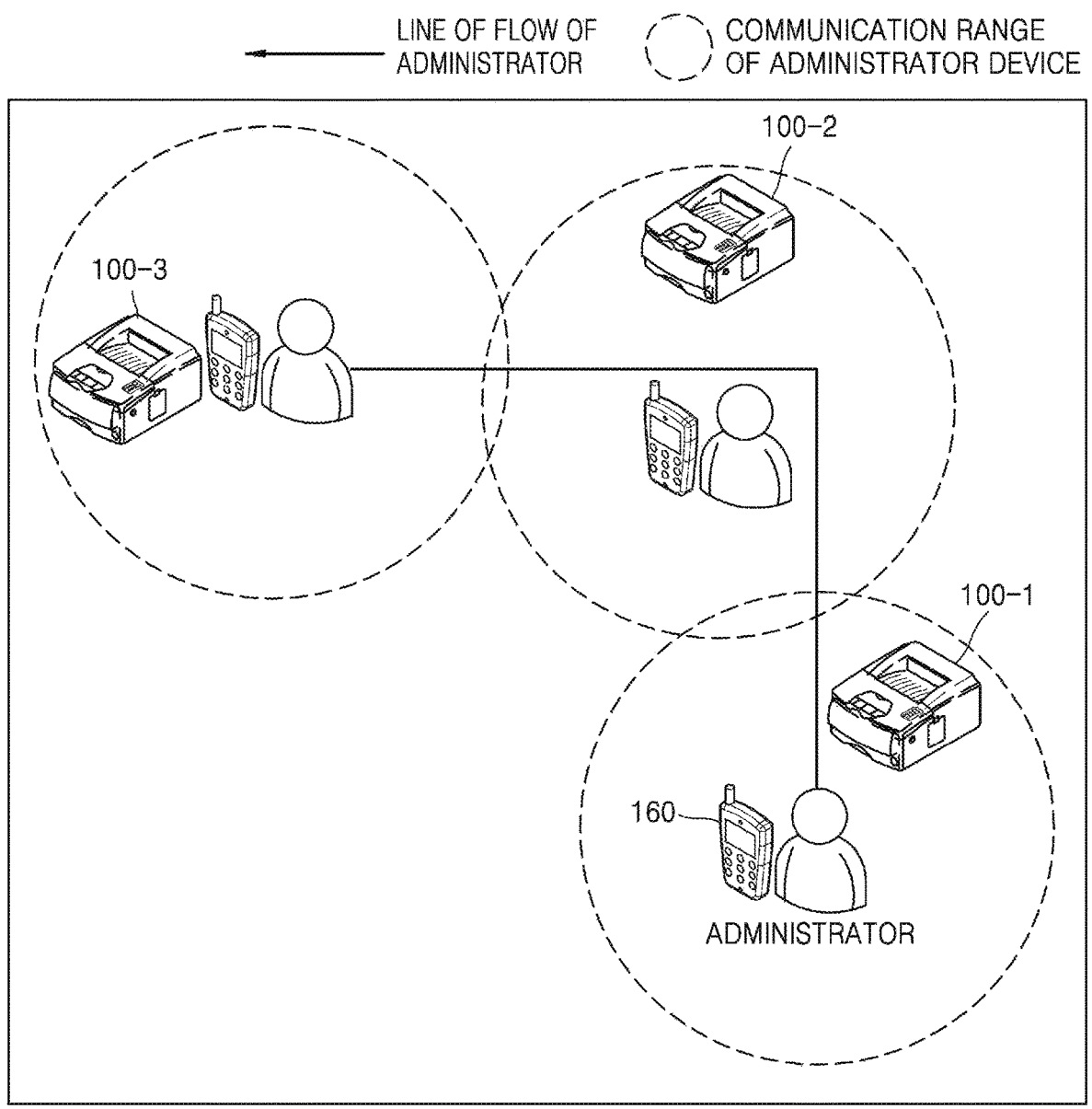
FIG. 10 illustrates performance of location information update or an initial setup as an administrator carries a location information measuring apparatus and moves around image forming apparatuses according to an example.

FIG. 10 illustrates performance of location information update or an initial setup as an administrator carries a location information measuring apparatus and moves around image forming apparatuses according to an example.

Referring to FIG. 10, when an administrator carries the location information measuring apparatus 160 and moves along a line of flow, the location information measuring apparatus 160 may update location information or perform an initial setup with each of image forming apparatuses 100-1, 100-2, and 100-3 within a range of communication with each other along with the movement of the administrator, according to the method described above with reference to FIG. 9.

Figure 11:
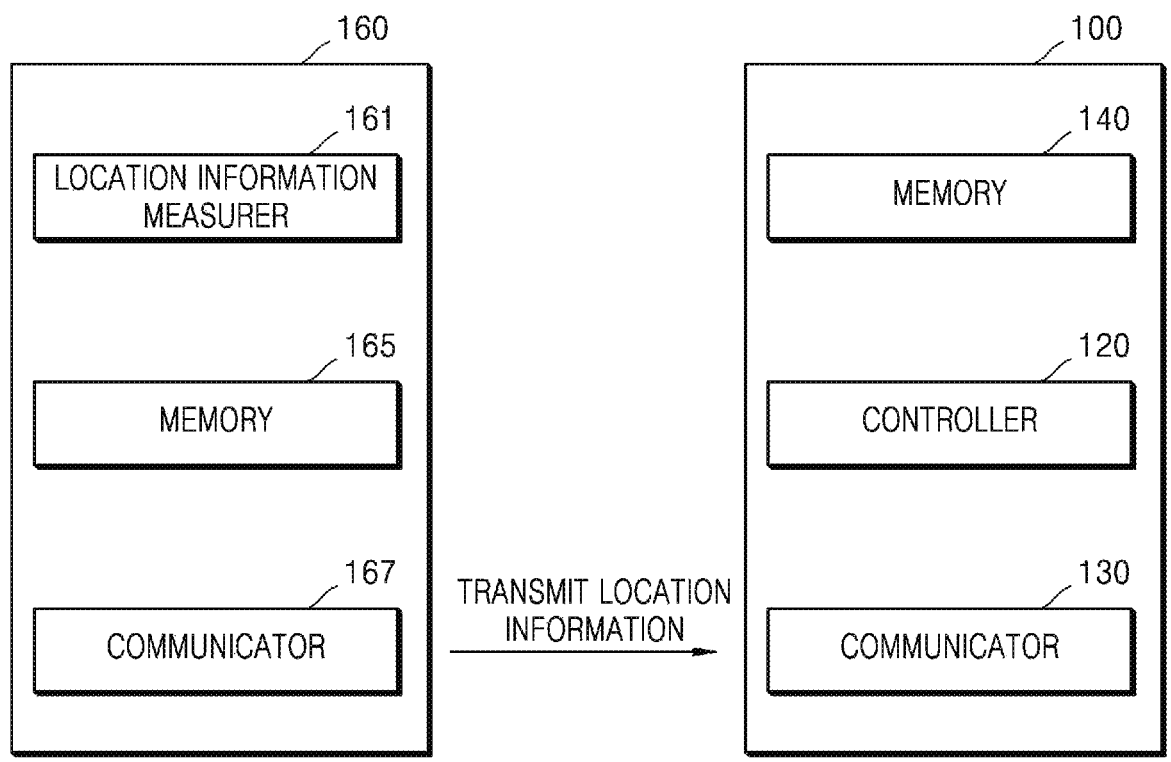
FIG. 11 illustrates a location information measuring apparatus and an image forming apparatus capable of providing a location-based service according to an example.

FIG. 11 illustrates a location information measuring apparatus and an image forming apparatus capable of providing a location-based service according to an example.

Referring to FIG. 11, the location information measuring apparatus 160 may include the location information measurer 161, the memory 165, the communicator 167, and the like.

The location information measurer 161 may measure the location information of the location information measuring apparatus 160 based on a distance from another device outside the location information measuring apparatus 160. The location information measurer 161 may accurately measure the position of the image forming apparatus 100 by using a distance from other external apparatuses having their own location information and the location information of the other external apparatuses. The location information measuring apparatus 160 may measure the location information according to a preset period or, when there is a location information request from the image forming apparatus 100, may measure the location information through the location information measurer 161.

The memory 165 may store the location information of the location information measuring apparatus 160.

The communicator 167 may transmit the location information of the location information measuring apparatus 160 to the image forming apparatus 100. To this end, the communicator 167 may request a connection with the image forming apparatus 100 and may transmit the location information of the location information measuring apparatus 160 when the image forming apparatus 100 approves the request. The communicator 167 may request the image forming apparatus 100 to release the connection when the location information transmission is completed.

The image forming apparatus 100 may include the controller 120, the communicator 130, the memory 140, and the like.

The memory 140 may store the location information of the image forming apparatus 100.

The communicator 130 may receive the measured location information from the location information measuring apparatus 160. To this end, the communicator 130 may receive a request for connection to the image forming apparatus 100 from the location information measuring apparatus 160 and may receive the measured location information from the location information measuring apparatus 160. The communicator 130 may receive a request for connection release from the image forming apparatus 100 from the location information measuring apparatus 160. When the communicator 130 receives a request for connection to the image forming apparatus 100 from the location information measuring apparatus 160, the controller 120 may perform user authentication for the location information measuring apparatus 160 and register unique information of the user authenticated location information measuring apparatus 160 in a unique information list in the memory 140. When the communicator 130 receives the request for connection release from the image forming apparatus 100 from the location information measuring apparatus 160, the controller 120 may release the connection and delete the unique information of the location information measuring apparatus 160 from the unique information list in the memory 140.

The controller 120 may determine whether to update the location information of the image forming apparatus 100 based on the location information of the image forming apparatus 100, stored in the memory 140, and the location information received from the location information measuring apparatus 160. When the communicator 130 receives the measured location information from the location information measuring apparatus 160, in a case that the unique information of the location information measuring apparatus 160 is in the unique information list in the memory 140, the controller 120 may determine whether to update the location information of the image forming apparatus 100 based on the location information of the image forming apparatus 100, stored in the memory 140, and the location information received from the location information measuring apparatus 160.

The controller 120 determines a difference between the location information stored in the memory 140 and the location information received from the location information measuring apparatus 160 and compares the determined difference with a first threshold. When the determined difference is greater than the first threshold, the controller 120 may update the location information of the image forming apparatus 100 with the received location information. However, the controller 120 may determine to maintain the location information stored in the memory 140 when the determined difference is less than the first threshold. The controller 120 may compare the determined difference with a second threshold that is greater than the first threshold and may further determine a certain process when the determined difference is greater than the second threshold.

The controller 120 may manage the location information of the image forming apparatus 100 based on a result of determining whether to update the location information. When the communicator 130 receives the measured location information from the location information measuring apparatus 160, in a case that the unique information of the location information measuring apparatus 160 is in the unique information list in the memory 140, the controller 120 may manage the location information of the image forming apparatus 100 according to a determination result based on the location information of the image forming apparatus 100, stored in the memory 140, and the location information received from the location information measuring apparatus 160.

Figure 12:
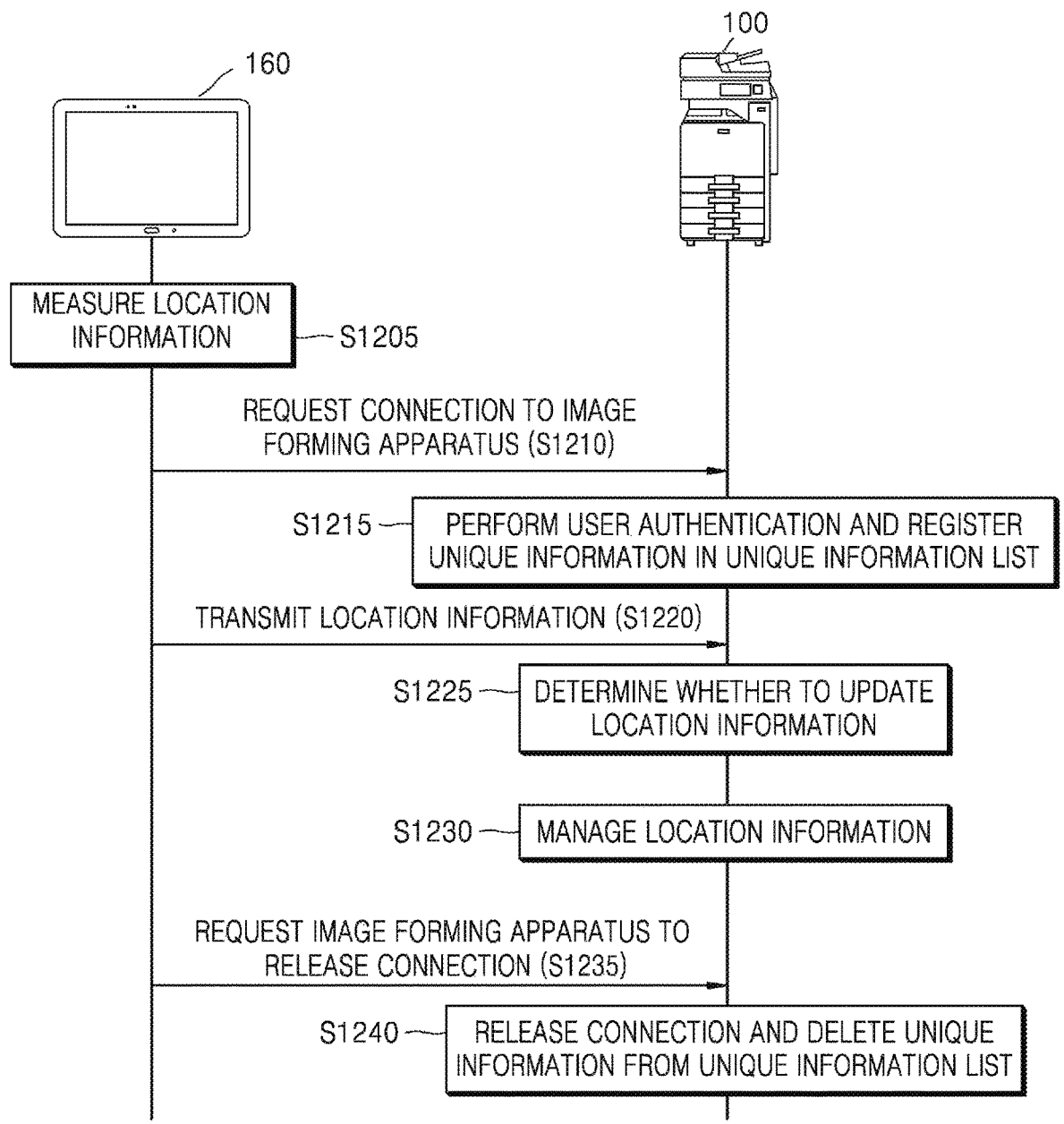
FIG. 12 illustrates operations of a location information measuring apparatus and an image forming apparatus in an environment in which a location-based service is provided according to an example.

FIG. 12 illustrates operations of a location information measuring apparatus and an image forming apparatus in an environment in which a location-based service is provided according to an example.

Referring to FIG. 12, the location information measuring apparatus 160 may measure the location information of the location information measuring apparatus 160 in operation S1205.

In operation S1210, the location information measuring apparatus 160 may request connection to the image forming apparatus 100.

In operation S1215, when the communicator 130 receives the request for connection to the image forming apparatus 100 from the location information measuring apparatus 160, the image forming apparatus 100 may perform user authentication for the location information measuring apparatus 160 and register unique information of the user authenticated location information measuring apparatus 160 in a unique information list.

In operation S1220, the location information measuring apparatus 160 may transmit the location information of the location information measuring apparatus 160. The location information measuring apparatus 160 may transmit the measured location information to the image forming apparatus 100 when the location information is measured.

In operation S1225, the image forming apparatus 100 may determine whether to update the location information of the image forming apparatus 100 based on the location information of the image forming apparatus 100 and the location information received from the location information measuring apparatus 160. When the image forming apparatus 100 receives the measured location information from the location information measuring apparatus 160, in a case that the unique information of the location information measuring apparatus 160 is in the unique information list, the image forming apparatus 100 may determine whether to update the location information of the image forming apparatus 100 based on the location information of the image forming apparatus 100 and the location information received from the location information measuring apparatus 160.

In operation S1230, the image forming apparatus 100 may manage the location information of the image forming apparatus 100 based on a result of determining whether to update the location information of the image forming apparatus 100.

In operation S1235, the location information measuring apparatus 160 may request the image forming apparatus 100 to release the connection.

In operation S1240, upon receiving the request for connection release from the image forming apparatus 100 from the location information measuring apparatus 160, the image forming apparatus 100 may delete the unique information of the location information measuring apparatus 160 from the unique information list.

Figure 13:
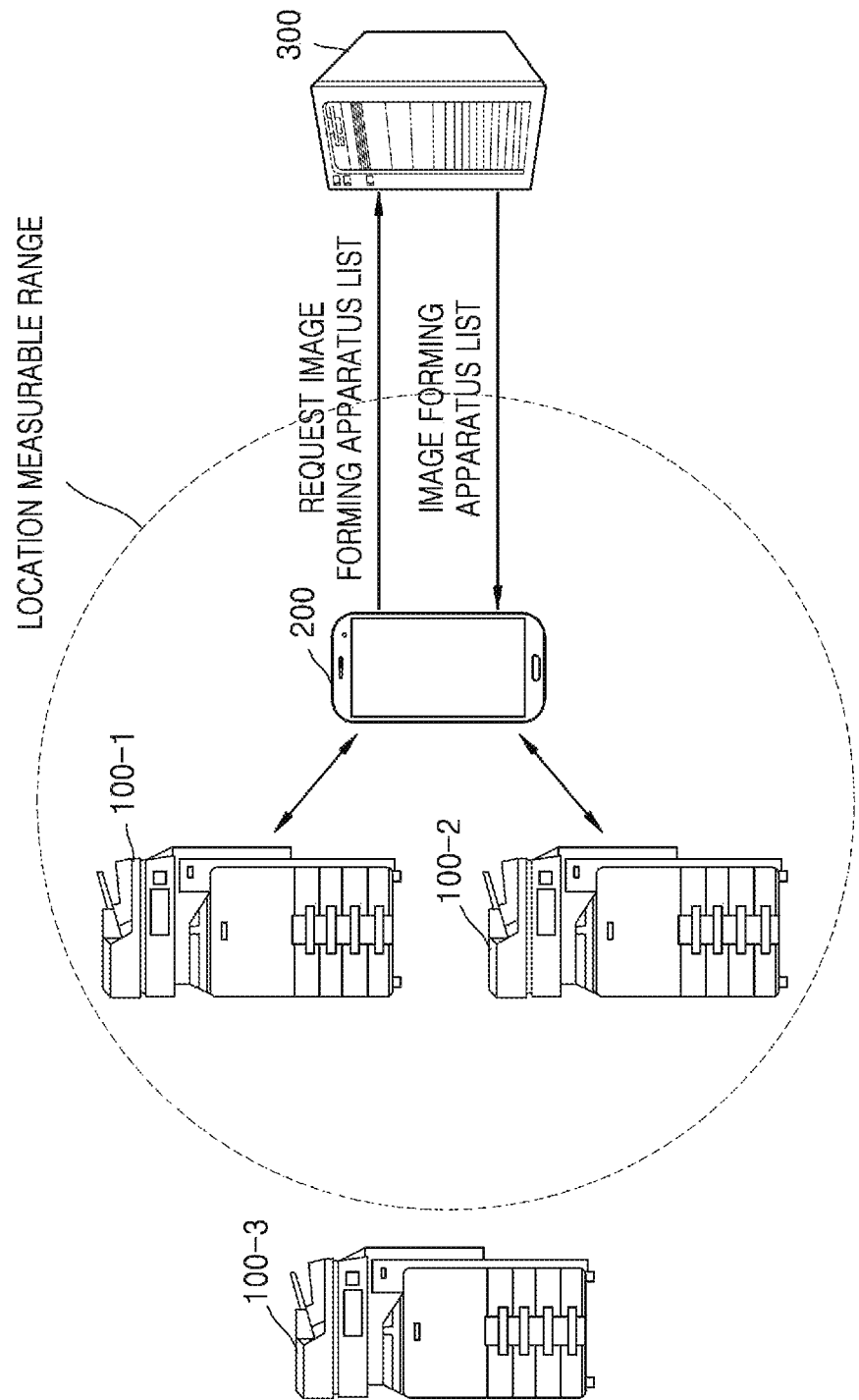
FIG. 13 illustrates an environment for executing a location-based service according to an example.

FIG. 13 illustrates an environment for executing a location-based service according to an example.

Referring to FIG. 13, the user terminal 200, capable of executing a location-based service, communicates with the image forming apparatus 100 (e.g., image forming apparatus 100-1, 100-2, or 100-3), capable of providing the location-based service, the external server 300, or the like to create the environment in which the location-based service is provided.

The user terminal 200, capable of executing the location-based service, may obtain actual distance information with the neighboring image forming apparatuses 100-1, 100-2, and 100-3 in a moving state to execute the location-based service, so that the user terminal 200 may provide the actual distance information to a user or use the actual distance information when executing the location-based service. The user terminal 200 may obtain location information of the image forming apparatuses 100-1, 100-2, and 100-3 and the location information of the user terminal 200 in order to obtain the actual distance information with the neighboring image forming apparatuses 100-1, 100-2, and 100-3.

As illustrated in FIG. 13, the user terminal 200 capable of executing the location-based service may obtain location information from each of the image forming apparatuses 100-1 and 100-2, or receive an image forming apparatus list including the location information of the image forming apparatus from the server 300 that manages the location information of the image forming apparatus.

The user terminal 200, capable of executing the location-based service, may measure the location information of the user terminal 200 based on a distance from another device outside the user terminal 200. For example, the position of the user terminal 200 may be accurately measured by using a distance from other external apparatuses having their own location information and the location information of the other external apparatuses.

The user terminal 200, capable of executing the location-based service, may obtain actual distance information with the neighboring image forming apparatuses 100-1, 100-2, and 100-3 based on the position of the user terminal 200 and the location information of the neighboring image forming apparatuses 100-1, 100-2, and 100-3, so that the user terminal 200 may provide the actual distance information to a user or use the actual distance information when executing the location-based service.

Figure 14:
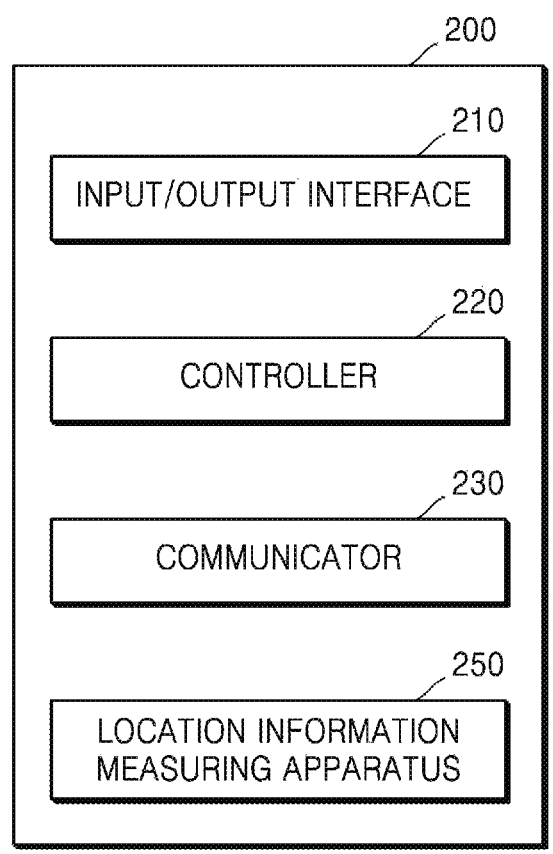
FIG. 14 illustrates a user terminal for executing a location-based service according to an example.

FIG. 14 illustrates a user terminal for executing a location-based service according to an example.

Referring to FIG. 14, the user terminal 200 may include the input/output interface 210, the controller 220, the communicator 230, and a location information measuring apparatus 250.

When a location-based service execution command is input to the user terminal 200, the user terminal 200 may operate as follows.

The communicator 230 may receive location information of at least one image forming apparatus from the at least one image forming apparatus. The communicator 230 may receive an image forming apparatus list including the location information of the at least one image forming apparatus from the server 300 that manages the location information of the image forming apparatus.

The location information measuring apparatus 250 may measure the location information of the user terminal 200 based on the distance from another apparatus outside the user terminal 200.

The controller 220 may obtain distance information between the user terminal 200 and the image forming apparatus based on the location information of the image forming apparatus received through the communicator 230, and the location information of the user terminal 200 measured by the location information measuring apparatus 250. The controller 220 may preferentially apply the location information of the image forming apparatus received from at least one of image forming apparatuses to the location information included in the image forming apparatus list received from the server 300 to obtain the distance information. The controller 220 may obtain the distance information based on the location information included in the image forming apparatus list received from the server 300 for an image forming apparatus that cannot receive location information.

The input/output interface 210 may output distance information between the user terminal 200 and the at least one image forming apparatus based on the obtained distance information.

Figure 15:
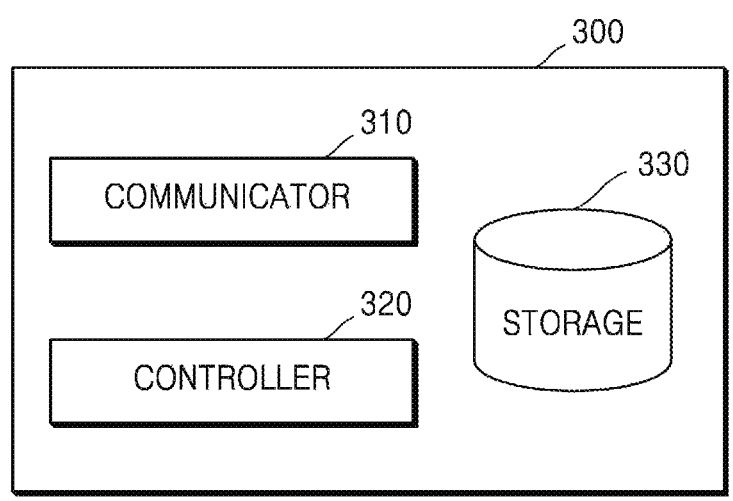
FIG. 15 illustrates a server in an environment for executing a location-based service according to an example.

FIG. 15 illustrates a server in an environment for executing a location-based service according to an example.

Referring to FIG. 15, the server 300 may include a communicator 310, a controller 320, and a storage 330. The server 300 may operate as a web server using the communicator 310 and the controller 320.

The communicator 310 may perform communication with the image forming apparatus 100 capable of providing the location-based service or the user terminal 200 capable of executing the location-based service.

The controller 320 may control the server 300 and may provide information stored in the server 300 or store information transmitted to the server 300 in response to a request from a device outside the server 300. For example, the server 300 may provide the user terminal 200 with an image forming apparatus list including location information of the image forming apparatus in response to a request from the user terminal 200. For example, the server 300 may compare the location information of the image forming apparatus 100, received from the image forming apparatus 100, with a location category classified according to a certain criterion to determine a location category to which the image forming apparatus 100 belongs. The server 300 may store the location category to which the determined image forming apparatus 100 belongs together with the received location information of the image forming apparatus 100.

The storage 330 may store data necessary for the operation of the server 300 or may store information received from the device outside the server 300.

Figure 16:
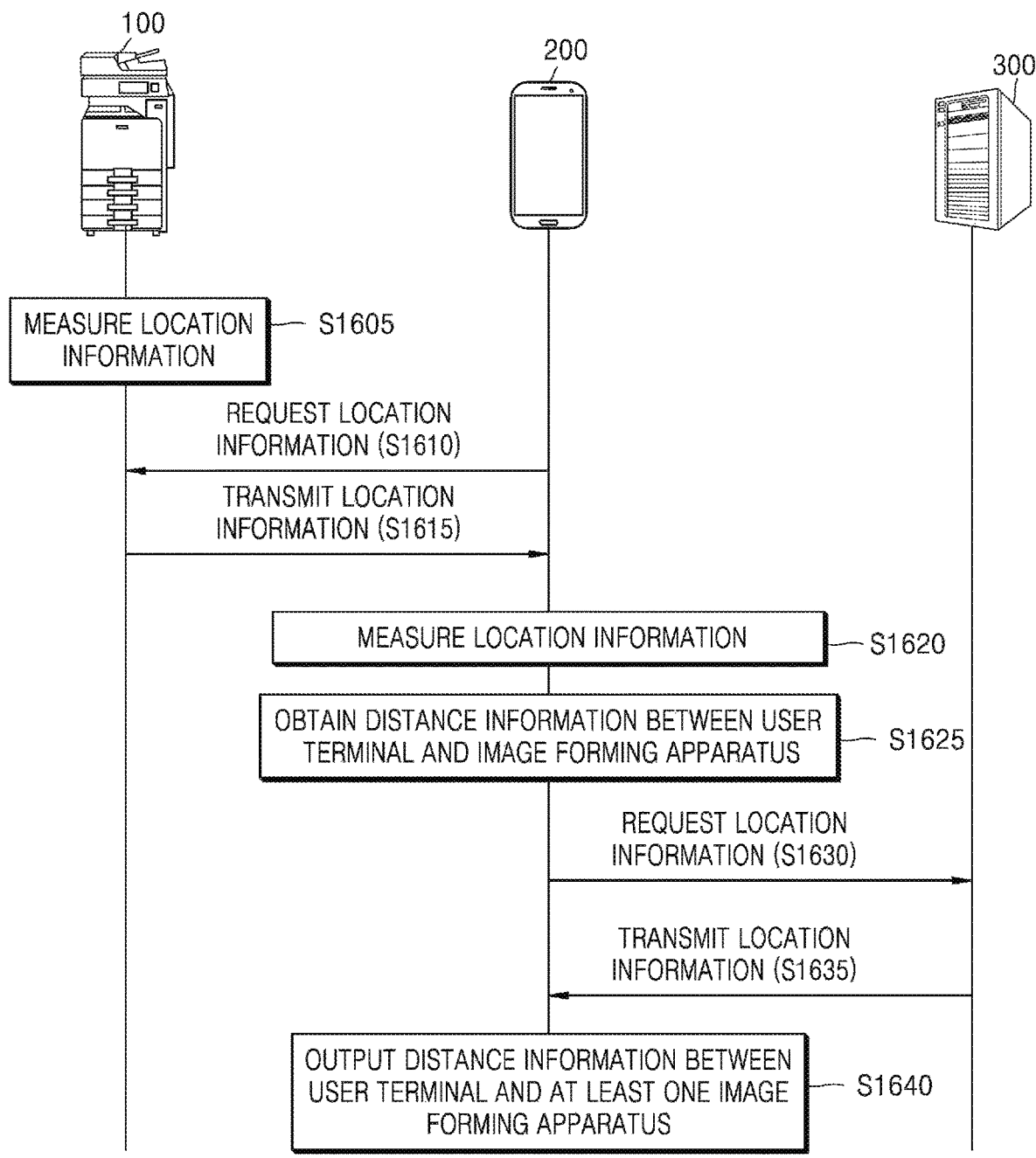
FIG. 16 illustrates operations of an image forming apparatus, a user terminal, and a server in an environment for executing a location-based service according to an example.

FIG. 16 illustrates operations of an image forming apparatus, a user terminal, and a server in an environment for executing a location-based service according to an example.

Referring to FIG. 16, the image forming apparatus 100 may measure location information of the image forming apparatus 100 in operation S1605. The image forming apparatus 100 may measure location information of the image forming apparatus 100 based on a distance from another device outside the image forming apparatus 100.

In operation S1610, the user terminal 200 may request the image forming apparatus 100 for the location information of the image forming apparatus 100.

In operation S1615, the image forming apparatus 100 may transmit the location information of the image forming apparatus 100 to the user terminal 200.

In operation S1620, the user terminal 200 may measure the location information of the user terminal 200. The user terminal 200 may measure the location information of the user terminal 200 based on a distance from another device outside the user terminal 200.

In operation S1625, the user terminal 200 may obtain distance information between the user terminal 200 and the image forming apparatus 100. The user terminal 200 may obtain the distance information between the user terminal 200 and the image forming apparatus 100 based on the location information of the image forming apparatus 100 received from each of neighboring image forming apparatuses and the location information of the user terminal 200 measured by the user terminal 200.

In operation S1630, the user terminal 200 may request the server 300 for the location information of the image forming apparatus 100.

In operation S1635, the server 300 may transmit the location information of the image forming apparatus 100 to the user terminal 200. In an example, the server 300 may transmit an image forming apparatus list including location information of at least one image forming apparatus to the user terminal 200.

In an example, operations S1630 and S1635 may be performed before operation 1610 in which the user terminal 200 requests location information from the image forming apparatus 100 or may be performed after operation S1625 when there is an image forming apparatus in which the user terminal 200 has failed to obtain the distance information.

In operation S1640, the user terminal 200 may output distance information between the user terminal 200 and at least one image forming apparatus. The user terminal 200 may preferentially apply the location information of the image forming apparatus received from the at least one of the image forming apparatuses to the location information included in the image forming apparatus list received from the server 300. However, for an image forming apparatus that cannot receive the location information, the user terminal 200 may obtain the distance information based on the location information included in the image forming apparatus list received from the server 300. The user terminal 200 may repeatedly re-measure and re-output the distance information between the user terminal 200 and the at least one image forming apparatus.

FIG. 17A, FIG. 17B, and FIG. 17C illustrate screens respectively displaying distance information between image forming apparatuses and a user terminal for executing a location-based service according to an example.

Referring to FIG. 17A, a screen may respectively display distance information between the image forming apparatuses 100-1, 100-2, and 100-3 and the user terminal 200 when the distance information is obtained according to the location information of the image forming apparatuses 100-1, 100-2, and 100-3 included in an image forming apparatus list received from the server 300.

Referring to FIG. 17B, a screen may respectively display distance information between the user terminal 200 and the image forming apparatuses 100-1, 100-2, and 100-3 when the user terminal 200 and the image forming apparatuses 100-1, 100-2, and 100-3 communicate with each other and each of the image forming apparatuses transmits the location information thereof to the user terminal 200. In a case of the third image forming apparatus 100-3, communication with the user terminal 200 may not be possible or the location information may be unknown. In that case, the user terminal 200 may output only the information about distances between the user terminal 200 and each of the first image forming apparatus 100-1 and the second image forming apparatus 100-2.

Referring to FIG. 17C, the user terminal 200 may preferentially apply the location information of the image forming apparatus received from the at least one of the image forming apparatuses to the location information included in the image forming apparatus list received from the server 300. And, for an image forming apparatus that cannot receive the location information, the user terminal 200 may display information about distances between the user terminal 200 and each of the image forming apparatuses 100-1, 100-2, and 100-3 on a screen based on the location information included in the image forming apparatus list received from the server 300. As illustrated in FIG. 17C, in the case of the first image forming apparatus 100-1 and the second image forming apparatus 100-2, the distance information shown in FIG. 17B is displayed, and in the case of the third image forming apparatus 100-3, the distance information to the user terminal 200 is unknown as shown in FIG. 17B, and thus, it can be seen that the distance information shown in FIG. 17A is displayed.

Figure 18:
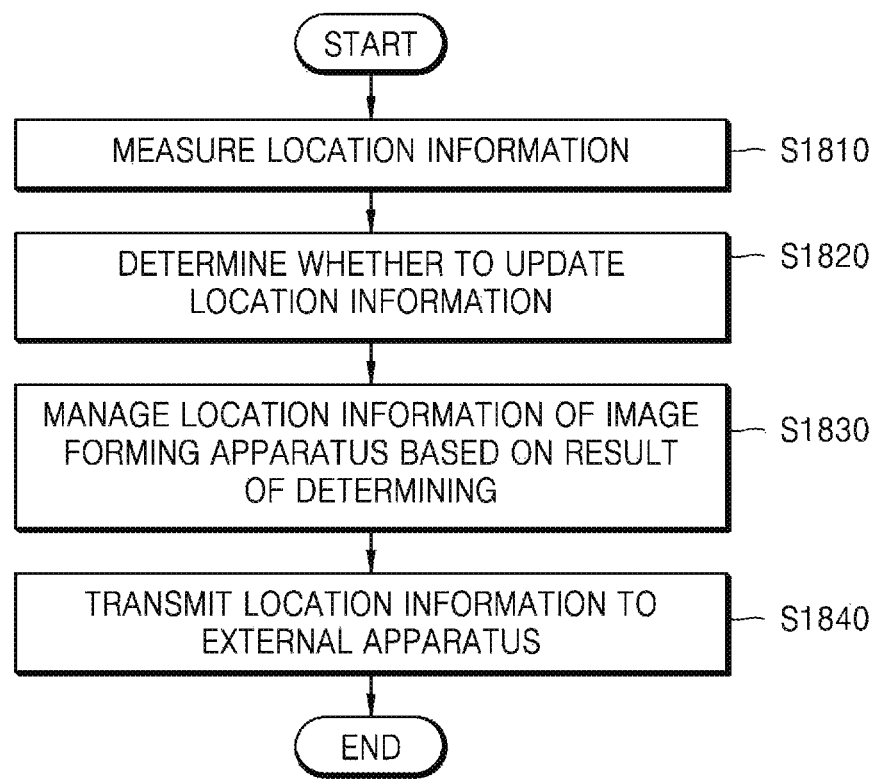
FIG. 18 is a flowchart illustrating a method of controlling an image forming apparatus capable of providing a location-based service according to an example.

FIG. 18 is a flowchart illustrating a method of controlling an image forming apparatus capable of providing a location-based service according to an example.

Referring to FIG. 18, the image forming apparatus 100 may measure location information of the image forming apparatus 100 in operation S1810. The image forming apparatus 100 may measure the location information of the image forming apparatus 100 by using the location information measuring apparatus 160 inside or outside the image forming apparatus 100. When the location information measuring apparatus 160 is inside the image forming apparatus 100, the location information measured by the location information measuring apparatus 160 may be the location information of the image forming apparatus 100. When the location information measuring apparatus 160 is outside the image forming apparatus 100, the location information of the image forming apparatus 100 may be measured by assuming that the location information received from the external location information measuring apparatus 160 is the same as the location information of the image forming apparatus 100 or by considering a certain relationship between the position of the image forming apparatus 100 and the position of the location information measuring apparatus 160 and estimating the position of the actual image forming apparatus 100.

In operation S1820, the image forming apparatus 100 may determine the location information of the image forming apparatus 100. The image forming apparatus 100 may determine whether to update the location information of the image forming apparatus 100 considering a level of position change between existing location information and newly measured location information. The image forming apparatus 100 may compare the level of position change with a certain threshold to determine whether to update the location information of the image forming apparatus 100.

In operation S1830, the image forming apparatus 100 may manage the location information of the image forming apparatus 100 based on a result of determining whether to update the location information of the image forming apparatus 100. When the level of position change is greater than the certain threshold, the image forming apparatus 100 may update the location information of the image forming apparatus 100 with the newly measured location information. When the level of position change is less than the certain threshold, the image forming apparatus 100 may maintain the location information of the image forming apparatus 100 as the existing location information.

In operation S1840, the image forming apparatus 100 may transmit the location information of the image forming apparatus 100 to an external apparatus outside the image forming apparatus 100. The image forming apparatus 100 may transmit the location information of the image forming apparatus 100 to the server 300 that manages the location information of the image forming apparatus 100 or the user terminal 200 that can execute the location-based service.

A method of controlling an image forming apparatus capable of providing the above-described location-based service can be written as computer programs and can be implemented in general-use digital computers that execute the programs using a non-transitory computer-readable recording medium. The non-transitory computer-readable recording medium may include read only memory (ROM), random access memory (RAM), flash memory, CD-ROMs, CD-Rs, CD+Rs, CD-DVD-Rs, DVD-Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, or solid-state disks (SSD), and may be any device capable of storing instructions or software, associated data, data files, and data structures, and providing the instructions or software, associated data, data files, and data structures to a processor or a computer such that the processor or computer may execute the instructions.

Examples have been described above. Descriptions of features or aspects within each example should typically be considered as available for other similar features or aspects in other examples. It should be understood that examples described herein should be considered in a descriptive sense only and not for purposes of limitation. While one or more examples have been described with reference to the figures, it will be understood by one of ordinary skill in the art that various changes in form and details may be made therein without departing from the spirit and scope as defined by the following claims.

What is claimed is:

1. An image forming apparatus capable of providing a location-based service, the image forming apparatus comprising:
   a memory to store location information of the image forming apparatus;
   a location information measuring apparatus to measure the location information of the image forming apparatus based on a distance from another apparatus outside the location information measuring apparatus; and
   a controller to:
      determine whether to update the location information of the image forming apparatus based on the location information stored in the memory and the measured location information, and
      manage the location information of the image forming apparatus.

2. The image forming apparatus of claim 1, wherein the controller:
   determines a difference between the location information stored in the memory and the measured location information,
   compares the determined difference with a first threshold,
   updates the location information stored in the memory with the measured location information when the determined difference is greater than the first threshold, and
   determines to maintain the location information stored in the memory when the determined difference is less than the first threshold.

3. The image forming apparatus of claim 2, wherein the controller:
   compares the determined difference with a second threshold that is greater than the first threshold, and
   determines a certain process when the determined difference is greater than the second threshold.

4. The image forming apparatus of claim 3, wherein the certain process changes at least one of an identification address of the image forming apparatus, which is set in the image forming apparatus, or a processing setting value related to a function of the image forming apparatus.

5. The image forming apparatus of claim 1, further comprising:
   a communicator to perform a connection with an external apparatus outside the location information measuring apparatus,
   wherein the controller transmits the updated location information of the image forming apparatus through the communicator to a server that manages location information of a plurality of image forming apparatuses.

6. The image forming apparatus of claim 5,
   wherein the transmitted location information of the image forming apparatus is compared with a location category classified according to a certain criterion to determine a location category to which the image forming apparatus belongs, and
   wherein the location category to which the determined image forming apparatus belongs is stored in the server together with the transmitted location information of the image forming apparatus.

7. The image forming apparatus of claim 1, wherein the location information measuring apparatus measures the location information of the location information measuring apparatus when at least one of the image forming apparatus starts, identification information of the image forming apparatus to be received from an external apparatus and used is changed, or a location information measurement instruction is input from a user.

8. The image forming apparatus of claim 1, wherein the location information of the image forming apparatus includes three-dimensional (3D) information including height information.

9. A location information measuring apparatus for providing location information to an image forming apparatus capable of providing a location-based service, the location information measuring apparatus comprising:
- a memory to store the location information of the image forming apparatus;
- a location information measurer to measure location information of the location information measuring apparatus based on a distance from another apparatus outside the location information measuring apparatus;
- a controller to determine whether to update the location information of the image forming apparatus based on the location information of the image forming apparatus and the measured location information; and
- a communicator to transmit the measured location information to the image forming apparatus according to a result of the update determination.

10. The location information measuring apparatus of claim 9, wherein the memory stores the location information of the image forming apparatus, received from the image forming apparatus, when the location information measuring apparatus is located within a range in which the location information measuring apparatus communicates with the image forming apparatus.

11. The location information measuring apparatus of claim 10, wherein the memory stores basic information for determining the initial setup received from the image forming apparatus when the location information measuring apparatus is located within the range in which the location information measuring apparatus communicates with the image forming apparatus.

12. An image forming apparatus capable of providing a location-based service by using a location information measuring apparatus, the image forming apparatus comprising:
- a memory to store location information of the image forming apparatus;
- a communicator to receive measured location information from the location information measuring apparatus for measuring the location information of the location information measuring apparatus based on a distance from another apparatus outside the location information measuring apparatus; and
- a controller to:
    - determine whether to update the location information of the image forming apparatus based on the location information of the image forming apparatus, stored in the memory, and the location information received from the location information measuring apparatus, and
    - manage the location information of the image forming apparatus.

13. The image forming apparatus of claim 12, wherein, when the communicator receives a request for connection to the image forming apparatus from the location information measuring apparatus, the controller performs user authentication for the location information measuring apparatus and registers unique information of the user authenticated location information measuring apparatus in a unique information list in the memory.

14. The image forming apparatus of claim 13, wherein, when the communicator receives the measured location information from the location information measuring apparatus, in a case that the unique information of the location information measuring apparatus is in the unique information list in the memory, the controller determines whether to update the location information of the image forming apparatus based on the location information of the image forming apparatus, stored in the memory, and the location information received from the location information measuring apparatus.

15. The image forming apparatus of claim 13, wherein, when the communicator receives a request for connection release from the image forming apparatus from the location information measuring apparatus, the controller deletes the unique information of the location information measuring apparatus from the unique information list in the memory.

* * * * *